S. ARBETTER.
BELT COUPLING.
APPLICATION FILED MAR. 9, 1917.
1,252,767.
Patented Jan. 8, 1918.
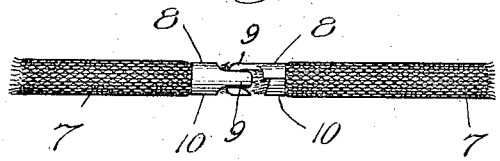
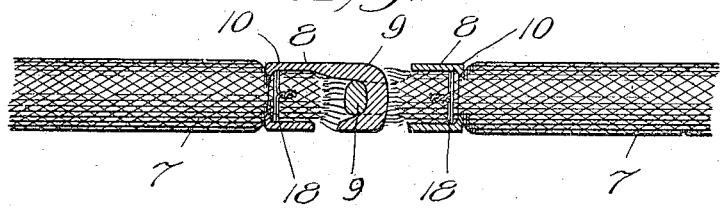
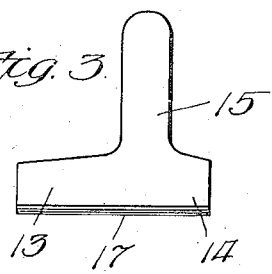
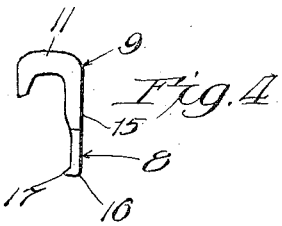
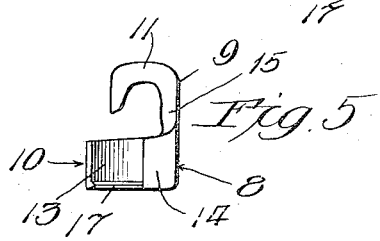
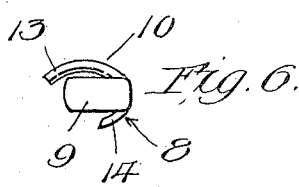
Witness:
Harry S. Gaither
Inventor:
Samuel Arbetter,
by Charles O. Shervey
Atty

UNITED STATES PATENT OFFICE.

SAMUEL ARBETTER, OF CHICAGO, ILLINOIS, ASSIGNOR TO A. C. K. BELTING CO., OF CHICAGO, ILLINOIS, A CORPORATION OF ILLINOIS.

BELT-COUPLING.

1,252,767.

Specification of Letters Patent.

Patented Jan. 8, 1918.

Application filed March 9, 1917. Serial No. 153,669.

*To all whom it may concern:*

Be it known that I, SAMUEL ARBETTER, a subject of the Czar of Russia, and a resident of Chicago, county of Cook, and State of Illinois, have invented certain new and useful Improvements in Belt-Couplings, of which the following is declared to be a full, clear, and exact description.

This invention relates to belt couplings, and its principal object is to provide a comparatively cheap, simple and substantial coupling for securing together the ends of rope belts or other round belts. The principal difficulty encountered in the production of round belt couplings, such as are used on sewing machine belts, is that the hook portions of the couplings wear out very rapidly, because of the friction, and rubbing movement of one upon the other in passing around pulleys of small diameter. The present invention has been designed to overcome this difficulty, and it consists in the several novel features hereinafter fully set forth and claimed.

The invention is clearly illustrated in the drawing accompanying this specification, in which:

Figure 1, is a side elevation of fragments of the ends of a round belt showing my improved belt coupling applied thereto; Fig. 2, is a longitudinal section therethrough; Fig. 3, is a face view of a blank, from which one of the coupling members is formed; Fig. 4, is a side elevation of said blank after the hook portion has been struck up; Fig. 5, is a side elevation of one of the coupling members after the collar portion thereof has been struck up; and Fig. 6, is an end view of the coupling member, seen in Fig. 5. Figs. 2, to 6, inclusive, are upon an enlarged scale.

Referring to said drawing, 7, 7, designate the end portions of a round belt which, if desired, may be composed of leather or strong rope, such as window sash cord or the like. 8, 8, designate the two coupling members of the belt coupling which members are similar, and for this reason but one of them will be described in detail. Each coupling member comprises a hook portion 9, and a collar portion 10, which collar portion surrounds the end of the belt and is tightly gripped thereon. The hook portion 9, is considerably thicker than the collar portion, and at the bend (indicated by the reference numeral 11) it is approximately oval in cross section. The sides of the hook are preferably parallel with each other, and at the extreme end of the hook portion the under side thereof is beveled off, as clearly shown in the drawing. The collar portion comprises two parts 13, 14, which merge into the neck portion 15, that connects the hooked end with the collar, and the part 13 of the collar is considerably longer than the part 14, whereby when said parts are clamped around the belt, the part 13, meets the part 14, at the side of the hook. The upper edges of said parts 13, 14, taper toward the extremities so that the end of the longer part 13, will be spaced farther from the hooked portion than the part 14, to facilitate the hooking of one of the members on the other. The edge 16, of the collar is preferably rounded off, and on that face which forms its inner face when curved up, is formed a lengthwise extending rib or bead 17, which becomes embedded in the belt when the hook is gripped thereon, and also engages with a wire or the like 18, which is tightly wound upon the belt near its end. The ends of said wire may be twisted together to secure it upon the belt.

In constructing the coupling member in accordance with the present invention, the blank, having the shape seen in Fig. 3, is first punched out of suitable metal having the thickness of the hook portion, and the collar and neck portions are flattened out by suitable dies to make them considerably thinner than the hook portion; the rib 17, is formed on the edge 16, of the collar portion by the dies. Thereafter the hook portion is formed with a suitable die or dies, and finally the collar portion is given its curved shape (see Fig. 6) with a suitable die. After the coupling member has been formed in the manner set forth, the hook portion alone is case hardened, the neck portion and collar portion being left soft in order that they may be bent around the belt in securing the coupling member thereto.

In attaching the coupling to the ends of a rope belt, the ends thereof are first wound with wire, and the ends thereof twisted together as above set forth, and the collar portions of the coupling members placed around the ends of the belt and clamped down thereon by a suitable instrument (not shown). The belt may now be trained around the pulleys of a machine upon which it is to be used, and the two coupling members hooked together by passing the point or tip of one through the loop of the other from that side containing the narrow end of the part 13, of the collar.

With the use of coupling members having case hardened hook portions and soft metal collar portions, the wear on the hook portions will not cause them to wear away so rapidly as if soft metal were used, and by providing soft metal collars it is possible to bend the same in applying the coupling members to the ends of the belt. Preferably the extreme ends of the belt project beyond the collar portions, and in practice practically contact with each other so that the hook portions are, in a great measure, embedded in the ends of the belt.

I claim as new and desire to secure by Letters Patent:

1. A belt coupling comprising two similar coupling members, each consisting of a single piece, having a relatively thick hook portion, and a relatively thin, bendable, split collar portion, the hook portion alone being case hardened.

2. A belt coupling comprising two similar coupling members, each consisting of a single piece, having a relatively thick hook portion, and a relatively thin, bendable, split collar portion, formed with a lengthwise extending bead on one edge, adapted to embed itself into the belt, the hook portion being relatively hard, and the collar portion being relatively soft.

3. A belt coupling comprising two similar coupling members, each consisting of a single piece comprising a relatively thick hook portion, and a relatively thin neck and bendable collar portion, the collar portion consisting of two parts projecting laterally from the neck portion, and one of said parts being longer than the other, whereby the meeting edges of said parts, when gripped upon a belt occupy a position at the side of the hook.

4. A belt coupling comprising two similar coupling members, each consisting of a single piece comprising a relatively thick hook portion, and a relatively thin neck and bendable collar portion, the collar portion consisting of two parts projecting laterally from the neck portion, and one of said parts being longer than the other, whereby the meeting edges of said parts, when gripped upon a belt occupy a position at the side of the hook, the long edge of the collar portion being formed with an inwardly projecting bead, adapted to be embedded in the belt when the collar is gripped thereon.

5. A belt coupling comprising two similar coupling members, each consisting of a relatively thick hook portion, and a relatively thin short, split collar portion, said collar portion being adapted to be gripped upon the end of the belt, and there being a wire member wrapped around the end of the belt and gripped by a collar.

6. A belt coupling comprising two similar coupling members, each consisting of a single piece comprising a relatively thick hook portion, and a relatively thin neck and bendable collar portion, the collar portion consisting of two parts projecting laterally from the neck portion, and one of said parts being longer than the other, and the upper edges thereof sloping toward their extremities.

7. A belt coupling comprising a light metal band secured on each end of the belt, and two similar coupling members each consisting of a single piece having a relatively thick hook portion and a relatively thin collar portion surrounding the end of the belt and the metal band, there being a rib on said collar embedded in the belt and contacting with said metal band.

8. A belt coupling comprising two similar coupling members, each consisting of a relatively thick hook portion and a relatively thin, short, split bendable collar portion, said collar portion having a circumferentially arranged inwardly projecting rib formed thereon, and said collar portion being adapted to be forced into gripping contact with the end of the belt, with the rib embedded therein.

SAMUEL ARBETTER.

Copies of this patent may be obtained for five cents each, by addressing the "Commissioner of Patents, Washington, D. C."